(12) United States Patent
Aiso et al.

(10) Patent No.: US 7,515,722 B2
(45) Date of Patent: Apr. 7, 2009

(54) SYSTEM AND METHOD FOR PROCESSING MULTIPLE AUDIO SIGNALS AND FOR CONTROLLING MULTIPLE DEVICES WITH CONTROL SIGNALS

(75) Inventors: Masaru Aiso, Hamamatsu (JP); Kotaro Terada, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 731 days.

(21) Appl. No.: 10/635,786

(22) Filed: Aug. 5, 2003

(65) Prior Publication Data

US 2004/0028247 A1 Feb. 12, 2004

(30) Foreign Application Priority Data

Aug. 8, 2002 (JP) .............................. 2002-231153

(51) Int. Cl.
*H02B 1/00* (2006.01)
*G06F 17/00* (2006.01)
*G11B 27/00* (2006.01)
*H04N 5/93* (2006.01)

(52) U.S. Cl. .................... 381/123; 381/119; 700/94; 386/54

(58) Field of Classification Search ............. 381/119, 381/118, 123, 124; 84/461–463; 386/4, 386/52–54; 700/94; 369/4; 715/716, 727–728, 715/723
See application file for complete search history.

(56) References Cited

U.S. PATENT DOCUMENTS

2001/0008572 A1* 7/2001 Ohmori et al. ................ 386/52

OTHER PUBLICATIONS

The Roland Corporation, VS-1680 Owners Manual, 1998.*

* cited by examiner

*Primary Examiner*—Vivian Chin
*Assistant Examiner*—Douglas J Suthers
(74) *Attorney, Agent, or Firm*—Morrison & Foerster LLP

(57) ABSTRACT

The present invention is directed to a signal processing apparatus for processing multiple signals, such as audio signals, and for controlling multiple external target devices (for example, an audio recorder). In accordance with a preferred embodiment, a signal from an external device connected to one of the input ports of the signal processing apparatus can be inputted to a corresponding input channel. In accordance with a preferred embodiment, the signal processing apparatus include faders that correspond to the input channels, and operation of each fader causes the transmission a control signal to the connected external devices to control the external device.

11 Claims, 8 Drawing Sheets

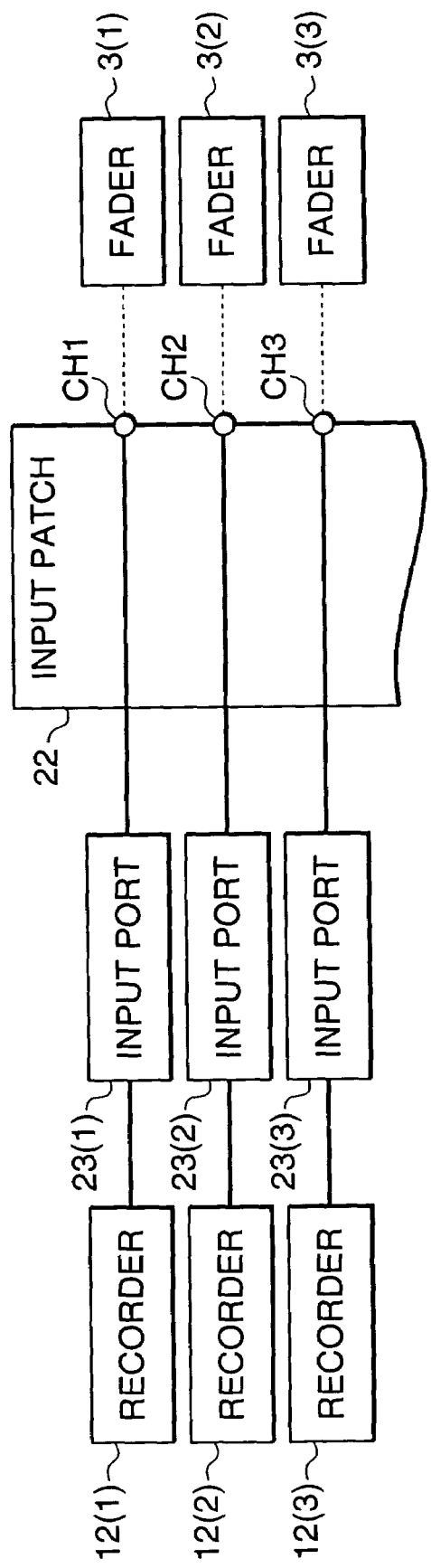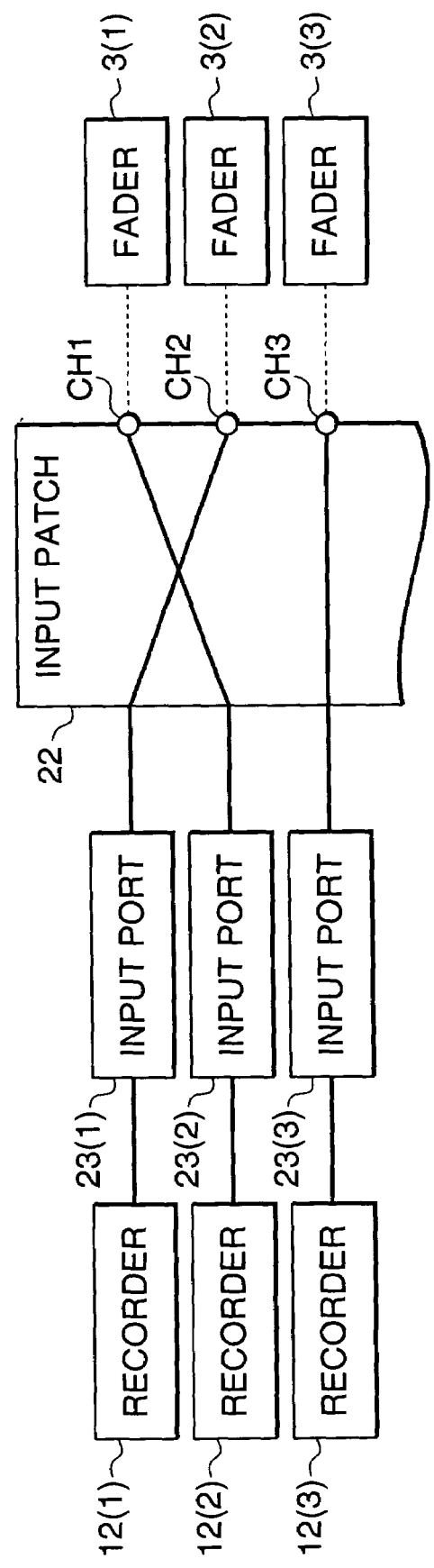

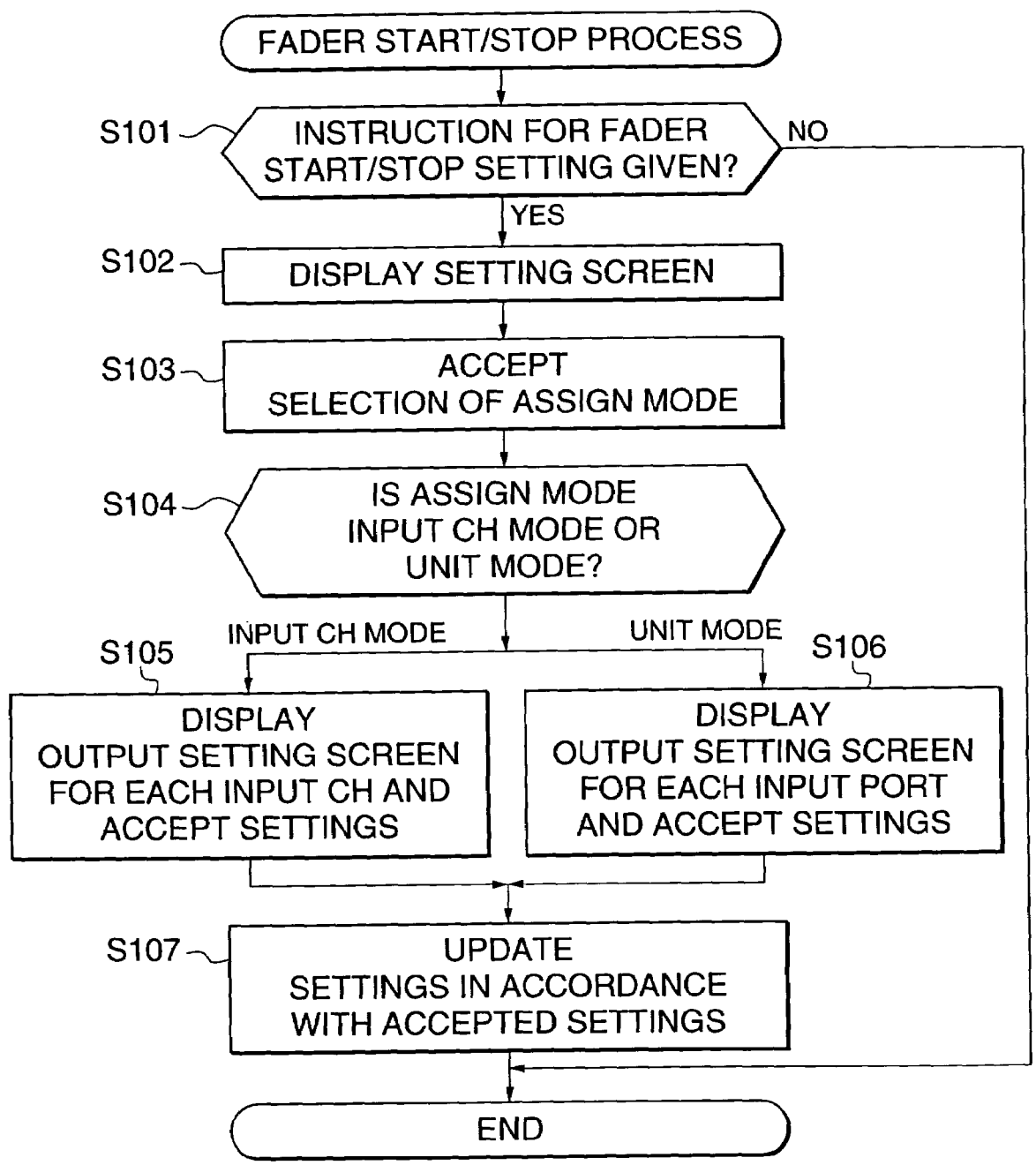

FIG. 7A

ASSIGN MODE: INPUT CH

- UNIT 1
- UNIT 2
- ...

| INPUT CH | OUTPUT FORM | OUTPUT DEVICE | PARAMETER |
|---|---|---|---|
| CH1 | GPI | ENGINE | START: OUTPUT PORT 1<br>STOP : OUTPUT PORT 2 |
| CH3 | MMC | ENGINE | |
| ... | ... | ... | ... |

FIG. 7B

ASSIGN MODE: INPUT CH

- UNIT 1
- UNIT 2
- ...

| INPUT PORT | OUTPUT FORM | OUTPUT DEVICE | PARAMETER |
|---|---|---|---|
| INPUT PORT (1) | GPI | ENGINE | START: OUTPUT PORT 1<br>STOP : OUTPUT PORT 2 |
| INPUT PORT (2) | MMC | ENGINE | |
| INPUT PORT (3) | | | |
| ... | ... | ... | ... |

SYSTEM AND METHOD FOR PROCESSING MULTIPLE AUDIO SIGNALS AND FOR CONTROLLING MULTIPLE DEVICES WITH CONTROL SIGNALS

BACKGROUND OF THE INVENTION

1. Field of the Invention

The present invention relates to a signal processing apparatus which receives signals for a plurality of channels inputted through a plurality of input ports thereof and then processes these signals, as well as a control program for controlling such a signal processing apparatus.

2. Description of the Related Art

Conventionally, a signal processing apparatus, such as a mixer apparatus which is capable of signal I/O processing such as a mixing process, receives audio signals or the like from a apparatus such as a recorder inputted through desired input ports and inputted to desired input channels. Then, the signal processing apparatus can process the received audio signals, e.g. by applying various effects to the signals and then output the resulting signals to a desired apparatus or system.

Further, the signal processing apparatus can perform operation control such as volume control and reproduction start or stop using operating elements such as faders for an apparatus such as a recorder which is connected to the input ports. For example, in a "fader start/stop", executed by a fader of a recorder to be controlled, every time the fader position passes a certain threshold (for example, −60 dB), a polarity change occurs, which acts a trigger to transmit a control signal to the recorder to provide control to start or stop reproduction or increase or decrease the signal level as the fader is operated. Alternatively, the fader can be used such that background music is played at a volume in accordance with the volume of a microphone.

The signal processing apparatus is provided with a number of input ports, a number of operating elements, and a number of input channels. However, typically, each operating element corresponds to one of the input channels. Accordingly, a device controlled by each operating element is determined by the corresponding input channel. For example, if a first fader is associated with a first input channel and the first input channel is associated with a first device, the first fader always controls the first device.

On the other hand, the connections between the input ports and the input channels can be set as desired using an input patch. The connections are set, for example, based on scenes which contain information on various settings. Specifically, when a setting for the input patch is switched in response to switching of the scene upon a scene recall that calls a scene, the connections between the input ports and the input channels are changed.

However, with the conventional signal processing apparatus, even when the setting for the input patch is switched, the device controlled by each operating element is determined by the corresponding input channel and remains unchanged. Consequently, a device that transmits a signal inputted to the input channel corresponding to an operated operating element may not the same as the target device to be controlled by this operating element.

For example, if the patch setting is such that a first input port and the first input channel are connected together and the first device is connected to the first input port, then a signal from the first device is inputted to the first input channel through the first input port. However, if the setting for the input patch is switched to connect a second input port and the first input channel together, a signal from a second device connected to the second input port is inputted to the first input channel, whereas, the first device remains a device to be controlled by the first fader corresponding to the first input channel. In this case, the first fader must be operated taking the mismatch between the transmitting device and the target device to be controlled into consideration. This does not match the user's feeling of operation. Thus, disadvantageously, the user cannot perform operations with ease.

SUMMARY OF THE INVENTION

It is a first object of the present invention to provide a signal processing apparatus that enables target devices to be controlled by operating elements to be set so as to match the user's feeling of operation, thus allowing a user to perform operations with ease, as well as a control program for controlling a signal processing apparatus.

It is a second object of the present invention to provide a signal processing apparatus which makes it possible to select, as the setting of the device to be controlled by an operating element, setting matching the user's feeling of operation or fixed setting, thus allowing the user to use the apparatus more easily and efficiently.

To attain the first object, in a first aspect of the present invention, there is provided a signal processing apparatus comprising a plurality of input ports that receive signals from a plurality of external devices, a control signal transmitting device that transmits control signals to the external devices, a plurality of input channels to which are input signals from respective ones of the external devices associated with respective ones of the input ports when the respective ones of the input ports are connected to the respective ones of the external devices, a plurality of predetermined operating elements associated with respective ones of the input channels, the predetermined operating elements being capable of controlling the external devices transmitting the control signals from the control signal transmitting device, a connection state setting device that sets connections between the input ports and the input channels, and a control target determining device that determines one of the external devices to be controlled by each of the predetermined operating elements based on the connections set by the connection state setting device.

With the signal processing apparatus according to the first aspect, one of the external devices to be controlled by each of the predetermined operating elements is determined based on the set connections between the input ports and the input channels. As a result, devices to be controlled by operating elements can be set so as to match the user's feeling of operation, thus allowing the user to perform operations with ease.

Preferably, the connection state setting device is capable of changing the connections between the input ports and the input channels, and in a first mode, the control target determining device selects one of the external devices to be controlled by each of the predetermined operating elements based on the connections set by the connection state setting device, and in a second mode, when the connection state setting device changes the connections, the control target determining device selects one of the external devices to be controlled by each of the predetermined operating elements, that was selected before the connection state setting device changes the connections.

Preferably, the control target determining device selects one of the external devices associated with one of the input ports connected, by the connection state setting device, to one of the input channels corresponding to one of the predetermined operating elements that is operated, as an external device to be controlled by the operated operating element.

More preferably, the signal processing apparatus further comprises a display that displays a screen for prompting an output setting for each of the input ports when the control target determining device selects the external device to be controlled by each of the predetermined operating elements.

To attain the second object, in a second aspect of the present invention, there is provided a signal processing apparatus comprising a plurality of input ports that receive signals from a plurality of external devices, a control signal transmitting device that transmits control signals to the external devices, a plurality of input channels to which are input signals from respective ones of the external devices associated with respective ones of the input ports when the respective ones of the input ports are connected to the respective ones of the external devices, a plurality of predetermined operating elements associated with respective ones of the input channels, the predetermined operating elements being capable of controlling the external devices transmitting the control signals from the control signal transmitting device, a connection state setting device that sets connections between the input ports and the input channels, and a mode setting device that selectively sets a first mode in which one of the external devices to be controlled by each of the predetermined operating elements is selected based on the connections set by the connection state setting device, and a second mode in which the input channels are associated with arbitrary ones of the external devices and one of the external devices associated with one of the input channels corresponding to one of the predetermined operating elements that is operated is selected as an external device to be controlled by the operated predetermined operating element.

With the signal processing apparatus according to the second aspect, in the first mode, one of the external devices to be controlled by each of predetermined operating elements is selected based on the set connections between the input ports and the input channels. As a result, devices to be controlled by operating elements can be set so as to match the user's feeling of operation, thus allowing the user to perform operations with ease. On the other hand, in the second mode, one of the external devices associated with one of the input channels corresponding to one of the predetermined operating elements that is operated is selected as an external device to be controlled by the operated predetermined operating element. As a result, it is possible to fix one of the external devices to be controlled by one of the predetermined operating elements regardless of the connections. Further, because the first mode or the second mode is selectively set, it is thus possible to select, as the setting of the device to be controlled by an operating element, setting matching the user's feeling of operation or fixed setting, thus allowing the user to use the apparatus more easily and efficiently.

To attain the first object, in a third aspect of the present invention, there is provided a control program executable by a computer to control a signal processing apparatus comprising a plurality of input ports that receive signals from a plurality of external devices, a control signal transmitting device that transmits control signals to the external devices, a plurality of input channels to which are input signals from respective ones of the external devices associated with respective ones of the input ports when the respective ones of the input ports are connected to the respective ones of the external devices, and a plurality of predetermined operating elements associated with respective ones of the input channels, the predetermined operating elements being capable of controlling the external devices transmitting the control signals from the control signal transmitting device, the program comprising, a connection state setting module for setting connections between the input ports and the input channels, and a control target determining module for determining determines one of the external devices to be controlled by each of the predetermined operating elements based on the connections set by the connection state setting module.

To attain the second object, in a fourth aspect of the present invention, there is provided a control program executable by a computer to control a signal processing apparatus comprising a plurality of input ports that receive signals from a plurality of external devices, a control signal transmitting device that transmits control signals to the external devices, a plurality of input channels to which are input signals from respective ones of the external devices associated with respective ones of the input ports when the respective ones of the input ports are connected to the respective ones of the external devices, and a plurality of predetermined operating elements associated with respective ones of the input channels, the predetermined operating elements being capable of controlling the external devices transmitting the control signals from the control signal transmitting device, the program comprising a connection state setting module for setting connections between the input ports and the input channels, and a mode setting module for selectively setting a first mode in which one of the external devices to be controlled by each of the predetermined operating elements is selected based on the connections set by the connection state setting module, and a second mode in which the input channels are associated with arbitrary ones of the external devices and one of the external devices associated with one of the input channels corresponding to one of the predetermined operating elements that is operated is selected as an external device to be controlled by the operated predetermined operating element.

A computer readable storage medium that stores the control program for controlling the signal processing apparatus, according to the third aspect or the fourth aspect constitutes the present invention.

The above and other objects, features, and advantages of the invention will become more apparent from the following detailed description taken in conjunction with the accompanying drawings.

BRIEF DESCRIPTION OF THE DRAWINGS

FIG. 4A is a schematic diagram showing an example of correspondence between input ports and input channels and faders 3 based on an input patch setting;

FIG. 4B is a schematic diagram showing another example of correspondence between the input ports and the input channels and the faders 3 based on another input patch setting;

FIG. 6 is a flow chart showing a fader start/stop setting process;

FIG. 7A is a diagram showing an example of a fader start/stop setting screen displayed when an "input CH mode" is set;

FIG. 7B is a diagram showing an example of a fader start/stop setting screen displayed when a "unit mode" is set.

DETAILED DESCRIPTION OF THE PREFERRED EMBODIMENTS

The present invention will now be described below with reference to the drawings showing a preferred embodiment thereof.

Figure 1:
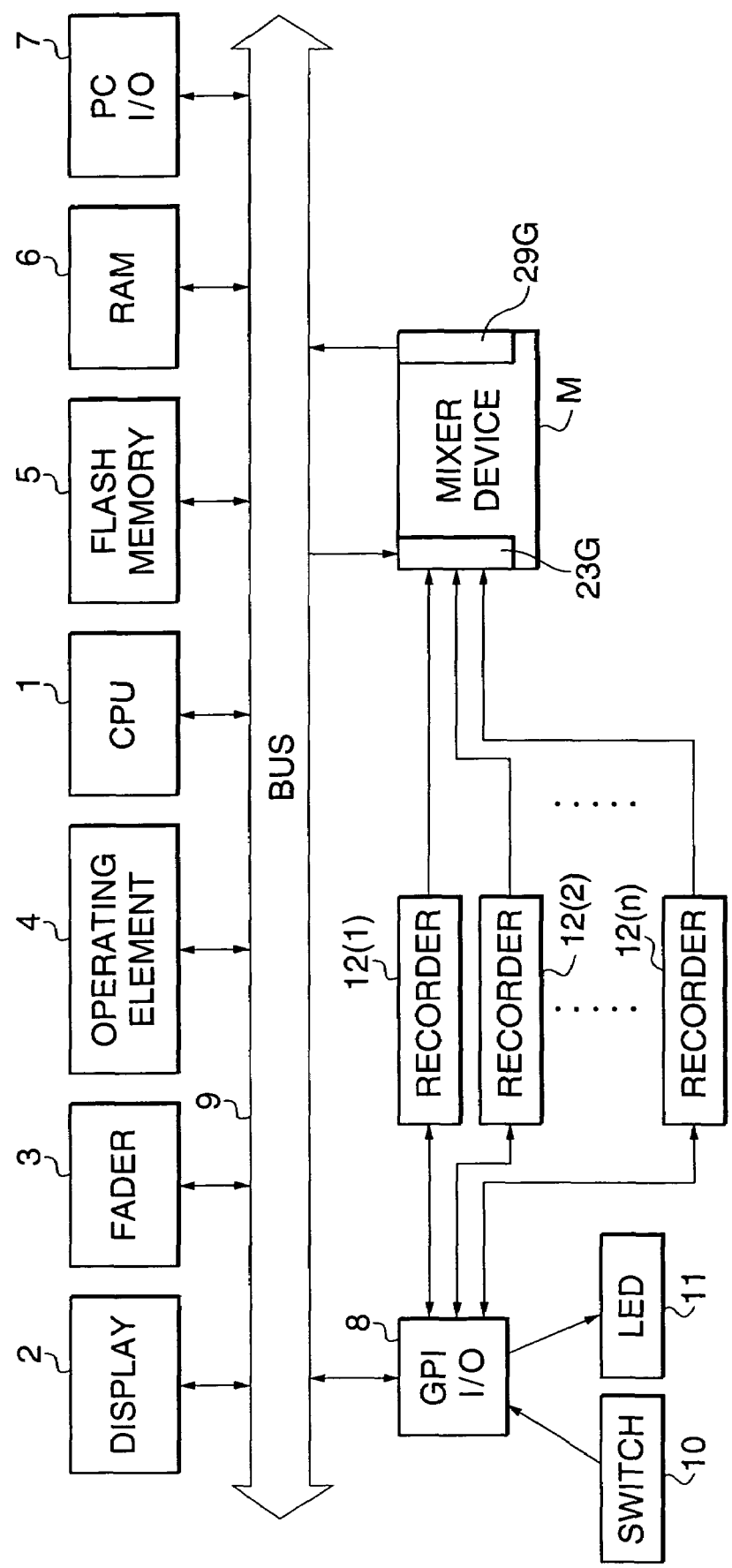
FIG. 1 is a block diagram showing the entire construction of a signal processing apparatus according to an embodiment of the present invention.

FIG. 1 is a block diagram showing the entire construction of a signal processing apparatus according to an embodiment of the present invention, which is configured as a mixer apparatus.

The signal processing apparatus according to the present embodiment is comprised of a display 2, faders 3 (predetermined operating elements), operating elements 4, a flash memory 5, a RAM 6, a PCI/O (Personal Computer Input and Output Device) 7, a GPII/O (General Purpose Interface) 8 (control signal transmitting device), and a mixer device M. All these component parts are connected to a CPU 1 via a bus 9.

The display 2 is composed of an LCD (Liquid Crystal Display) or the like to display various information such as a setting screen. The flash memory 5 stores various data and operation programs executed by the CPU 1. The operating elements 4 are used to input various information. The RAM 6 temporarily stores various data. The CPU 1 controls the whole signal processing apparatus, including the mixer device M and the display 2. The CPU 1 detects a position of each fader 3 and an operation of each operating element 4. Each fader 3 adjusts a volume and the like for a corresponding channel.

The flash memory 5 stores a patch library (PATCH) in which a plurality of (for example, 100) sets of connections between an input patch and an output patch are registered, a name library (NAME) in which a plurality of (for example, 100) sets of names of MIX output channels and MATRIX output channels are registered, and a unit library (UNIT) in which a plurality of (for example, 100) sets of settings (gain, polarity, and the like) for each input to each connected input port and settings (gain, polarity, and the like) for each output from each connected output port are registered.

The flash memory 5 also stores about 1,000 scenes identified by serial numbers. The scenes contain settings for each input channel (effect, fader, output destination, output level, and the like for each channel), settings for each output channel (effect, fader, matrix output channel input source, input level, and the like for each channel), settings for internal effecters, settings for built-in equalizers, monitor settings, and the like. The scenes also contain settings for patches (wiring switching devices) each of which determines an input port (physical channel) through which a corresponding input channel is to receive a signal and an output port to which the input channel is to output the signal.

Connected to the GPII/O 8 are a switch 10, a LED 11, a plurality of recorders 12(1) to 12(n) via a plurality of GPI input ports (also referred to as the "GPIin") or a plurality of GPI output ports (also referred to as the "GPIout"). The switch 10, LED 11, and recorders 12 are all provided externally of and separately from the present signal processing apparatus. Each recorder 12 is also connected to the mixer device M. The mixer device M contains a signal processing section, not shown, to execute mixing processing such as reception of signals from a plurality of systems, application of effects, and outputting of a signal to a desired system.

Various signals such as signals based on operations of the faders 3 or operating elements 4 and "tally signals" (for example, play tally signals indicative of reproduction states) indicative of states of the recorders 12 are inputted to the GPII/O 8. In a process using the GPII/O 8, functions to be executed in response to various input signals can be set beforehand. Thus, when a particular input signal is received, it can be used as a trigger to execute the corresponding function.

Figure 2:
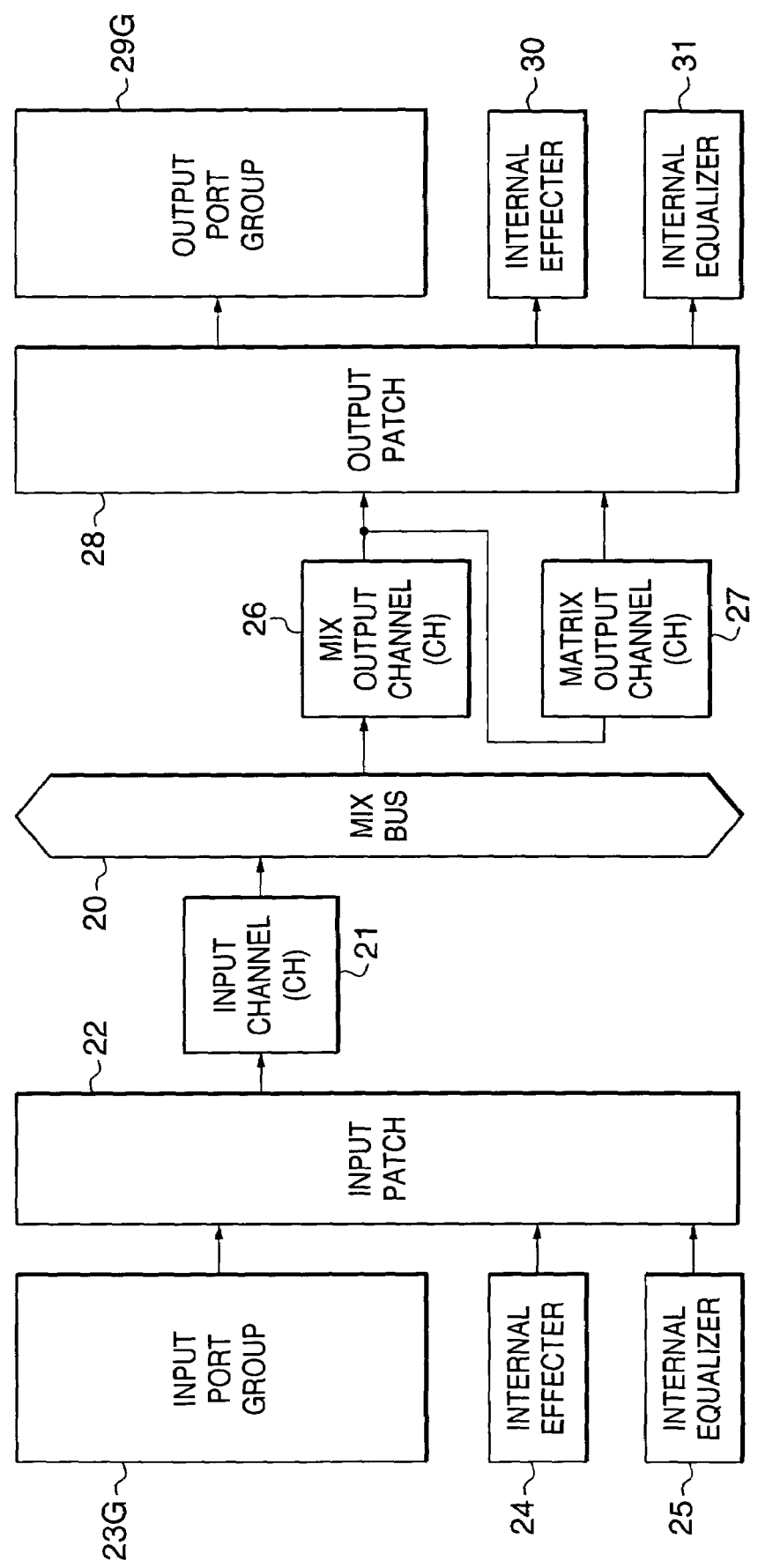
FIG. 2 is a block diagram showing the construction of a mixer device appearing in FIG. 1.

FIG. 2 is a block diagram showing the construction of the mixer device M appearing in FIG. 1.

As shown in FIG. 2, an input port group 23G comprised of a plurality of input ports 23 (input ports 23(1) to 23(n)) to which the respective recorders 12 are connected, an internal effecter 24, and an internal equalizer 25 are connected to input channels (hereinafter also referred to as the "input CH" or "input channel CH") 21 via an input patch 22. The input channel 21 is connected to a mix bus 20. Further, MIX output channels (CH) 26 are connected to the mix bus 20. The MIX output channels 26 are also connected to an output patch 28 via MATRIX output channels (CH) 27 and directly to the output patch 28. The output patch 28 is connected to an output port group 29G comprised of a plurality of output ports 29, an internal effecter 30, and an internal equalizer 31.

The input channel 21 is comprised of a plurality of (for example, 96) channels (CH1 to CHn), each provided with a limiter, a compressor, an equalizer, a fader, a pan, an output destination selecting device, an output level adjusting device, and the like, none of which are shown. The input patch 22 selectively connects the input ports 23(1) to 23(n) and the channels CH1 to CHn of the input channel 21 to control the connections. The mix bus 20 mixes signals inputted through the input channels 21.

The MIX output channels 26 are each provided with a limiter, a compressor, an equalizer, a fader, and the like, none of which are shown. Signals from the MIX output channels 26 are selectively inputted to the MATRIX output channels 27. The MATRIX output channels 27 mix these signals and then output the mixed signals. The output patch 28 selectively connects outputs from the MIX output channels 26 to the output ports 29 of the output port group 29G.

Figure 3:
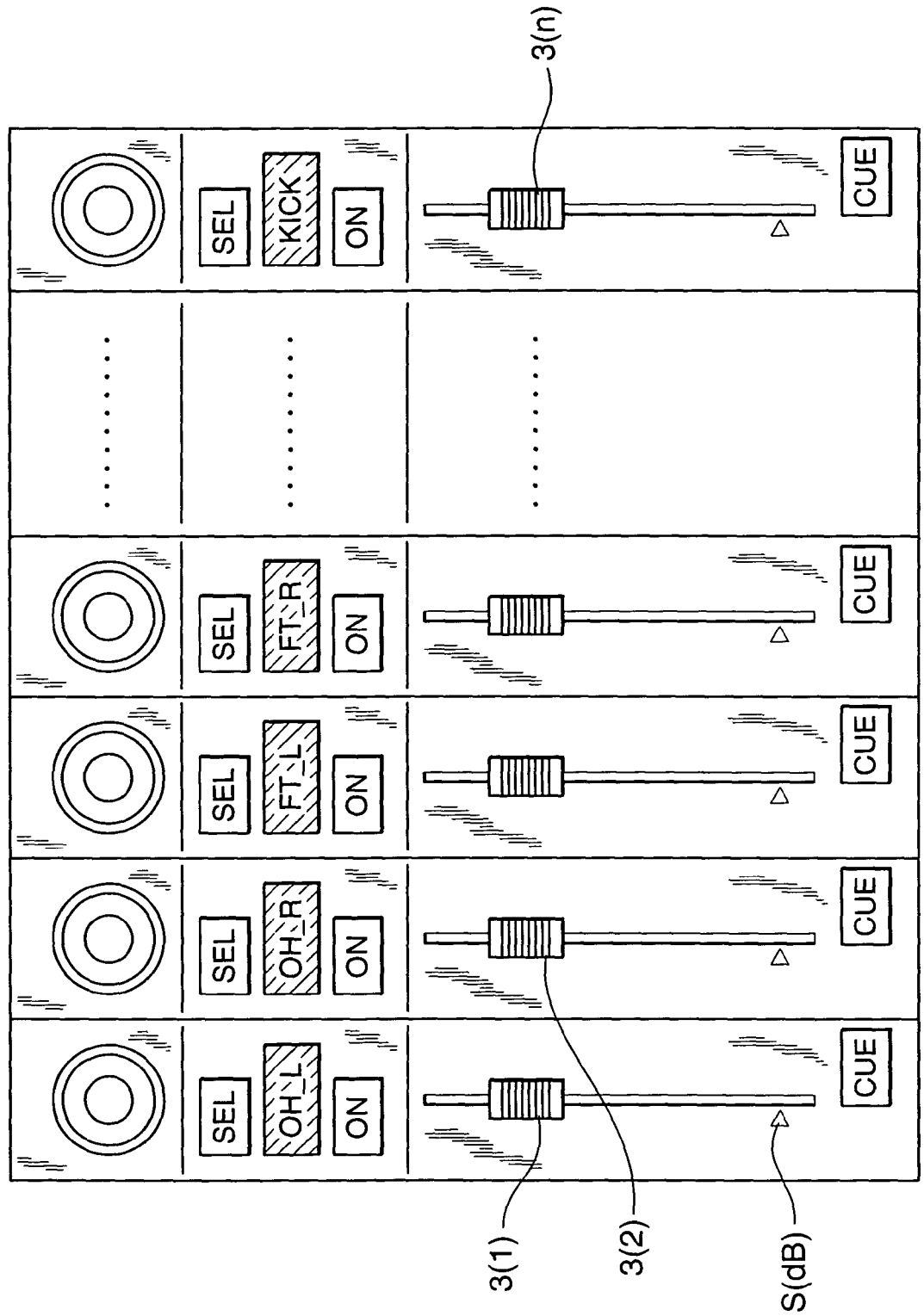
FIG. 3 is a view showing a part of the construction of an operation panel including a plurality of faders.

FIG. 3 is a view showing a part of the construction of an operation panel including a plurality of faders 3. Each of the faders 3(1) to 3(n) is slidable in a vertical direction. A threshold value, shown at the bottom of each fader, is set at about −60 dB. Description of the other elements shown in FIG. 3 is omitted.

The plurality of faders 3 are provided so that each of the faders 3 corresponds to at least one input channel 21. For example, 96 input channels 21 and 48 faders 3 are provided.

To set the connections by the input patch 22 (this setting will hereinafter be referred to as the "input patch setting"), a plurality of patterns can created in advance and, for example, the created patterns can be stored in the flash memory 5 as a patch library. The input patch setting is stored in association with a scene. However, the input patch setting does not necessarily correspond to a scene. Further, the present signal processing apparatus has a function called a "scene memory recall". By depressing a button or the like, not shown, of the operating elements 4 to which this function is assigned, a scene with the next number is called. Then, the input patch setting is automatically switched to the input patch setting corresponding to the called scene.

FIGS. 4A and 4B are schematic diagram showing an example of the correspondence between the input ports 23 and the input channels CH and the faders 3. In FIGS. 4A and 4B, the input channels CH1, CH2, and CH3 are associated with the faders 3(1), 3(2), and 3(3), respectively, while the recorders 12(1), 12(2), and 12(3) are connected to the input ports 23(1), 23(2), and 23(3), respectively. Further, for a device to be controlled by each fader 3, the recorders 12(1), 12(2), and 12(3) are associated with the input channels CH1, CH2, and CH3, respectively, in an input CH mode, described later. Here, only a typical arrangement is described in which three input ports (23(1), 23(2), 23(3)), three input channels (CH1, CH2, CH3), and three faders (3(1), 3(2), 3(3)) are made to correspond to or be combined with one another. It should be noted that the present invention is not limited to the typical arrangement shown. Rather, one skilled in the art would appreciate that additional import ports, channels, and faders may be added to configure other types of combinations.

In the example shown in FIG. 4A, in accordance with the input patch setting in the input patch 22, the input ports 23(1), 23(2), and 23(3) are connected to the input channels CH1, CH2, and CH3, respectively. In this case, an audio signal from the recorder 12(1) is inputted to the input channel CH1 through the input port 23(1). Likewise, audio signals from the recorders 12(2) and 12(3) are inputted to the input channels CH2 and CH3 through the input ports 23(2) and 23(3), respectively.

Figure 5A:
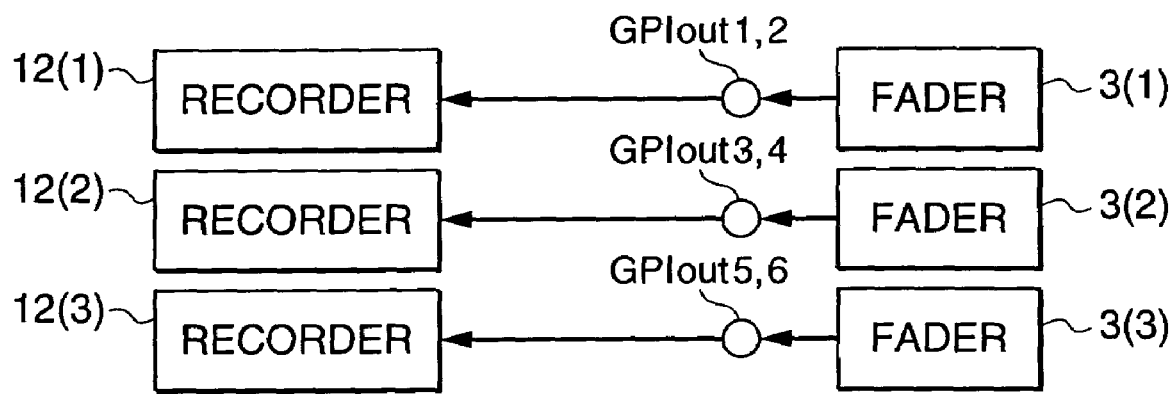
FIG. 5A is a schematic diagram showing an example of relationship between the faders and recorders to be controlled by the faders.
Figure 5B:
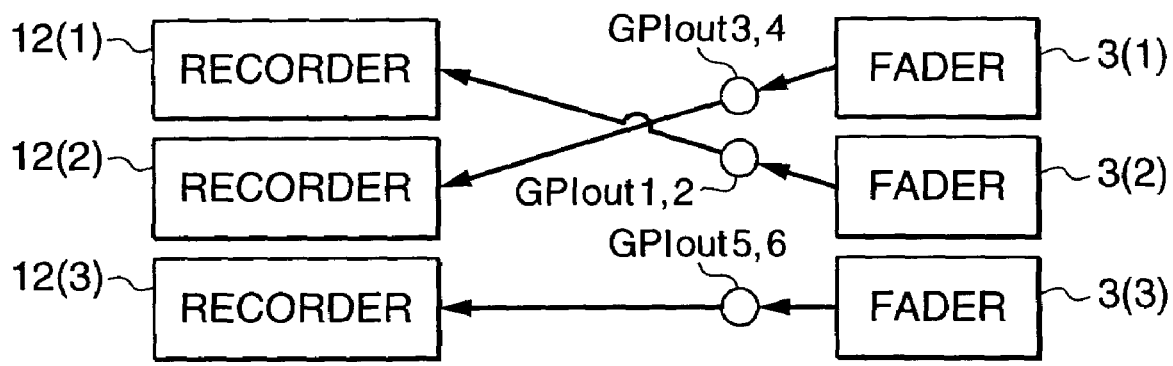
FIG. 5B is a schematic diagram showing another example of relationship between the faders and the recorders to be controlled by the faders.

FIGS. 5A and 5B are schematic diagram showing an example of relationship between the faders 3 and the recorders 12 to be controlled by them. In the example shown in FIG. 4A, the device to be controlled by the fader 3(1) is the recorder 12(1) associated with the corresponding input channel CH1 as shown in FIG. 5A. Thus, the fader 3(1) can be operated to control operations such as reproduction, adjustment of volume, and reproduction stop of the recorder 12(1) through the GPI output ports 1 and 2 (GPIout 1 and 2). Similarly, the devices to be controlled by the faders 3(2) and 3(3) are the recorders 12(2) and 12(3), respectively. The GPI output ports will be described below in detail with reference to FIG. 7.

Further, if the input patch setting is switched to connect the input ports 23(1), 23(2), and 23(3) to the input channels CH2, CH1, and CH3, respectively, as shown in FIG. 4B, audio signals from the recorders 12(1), 12(2), and 12(3) are inputted to the input channels CH2, CH1, and CH3 through the input ports 23(1), 23(2), and 23(3). However, in the input CH mode, the devices to be controlled by the faders 3(1) to 3(3) remain unchanged even after the input patch setting has been switched. That is, the relationship shown in FIG. 5A is maintained. FIG. 5B will be described later.

FIG. 6 is a flow chart showing a fader start/stop setting process. FIGS. 7A and 7B show examples of a fader start/stop setting screen. FIG. 7A shows a setting screen displayed when the "input CH mode" is set. FIG. 7B shows a setting device displayed when a "unit mode" is set.

First, in FIG. 6, it is determined whether or not a setting instruction for fader start/stop has been given (step S101). If the setting instruction has not been given, the present process is terminated. On the other hand, if the setting instruction has been given, a fader start/stop setting screen 32, shown in FIG. 7A or 7B, is displayed on the display 2 (step S102). In this case, first, items for an assign mode 33 are displayed on the fader start/stop setting screen 32. Then, in the fader start/stop setting screen 32, a choice for the assign mode is accepted (step S103). Here, the assign mode includes the "input CH mode" (a second mode) and the "unit mode" (a first mode), mentioned above. The step S102 may be configured to determine which of the fader start/stop setting screens 32 shown in FIGS. 7A and 7B is to be displayed, for example, depending on the currently set assign mode, or one of them may be always displayed by default.

In the "input CH mode", regardless of the input patch setting in which one of the recorders 12 is associated with one of the input channels CH, the device to be controlled by each fader 3 is an external device (recorder 12 or LED 11) associated with the input channel CH corresponding to the fader 3. On the other hand, in the "unit mode", when the input patch setting is such that one of the input ports 23 is connected to the input channel CH corresponding to a fader 3 that is operated, the device to be controlled by the operated fader 3 is an external device connected to the GPI output port (GPIout) set to be associated with this input port 23. In this mode, the device to be controlled by each fader 3 can be changed depending on the input patch setting. For example, if any of the recorders 12 is connected to the GPIout associated with an input port 23 that is connected, this recorder 12 is controlled by the fader 3.

In a step S103, if the user desires to select the "input CH mode", he selects and depresses an item "input CH mode" from the items for the assign mode 33 so that the indication of "input CH mode" is highlighted as shown in FIG. 7A. On the other hand, if the user desires to select the "unit mode", selects and depresses a desired item of "unit 1" . . . in the items for the assign mode 33 so that the indication of the selected item is highlighted as shown in FIG. 7B. A plurality of input ports 23 are related to each of "unit 1". Accordingly, an output setting can be made for the input port 23 corresponding to the selected unit. Further, a plurality of units can be selected at a time.

Referring again to FIG. 6, it is then determined whether the selected assign mode 33 is the "input CH mode" or the "unit mode" (step S104). If the "input CH mode" has been selected, the process proceeds to a step S105. Then, a screen 34 for output setting for each input CH, shown in FIG. 7A, is displayed in the fader start/stop setting screen 32 to accept settings. In the screen 34 for output setting for each input CH, an input CH, an output form, an output device, and parameters are set.

For example, the channel CH1 is set as the input CH, the GPI is set as the output form, and an engine is set as the output device. As the parameters, two GPI output ports are set because they are used for the fader start and fader stop, respectively. For example, the GPI output port 1 (GPIout1) is set for the fader start, whereas the GPI output port 2 (GPIout2) is set for the fader stop. With such a setting, if the recorder 12(1) is associated with the input CH1, the device to be controlled by the fader 3(1) corresponding to the input Ch1 is the recorder 12(1). Then, a fader-on event and a fader-off event as control signals are transmitted to the recorder 12(1) through the GPI output ports 1 and 2, respectively.

On the other hand, if the selected assign mode 33 is the "unit mode", the process proceeds to a step S106, where a screen 35 for output setting for each input port, shown in FIG. 7B, is displayed in the fader start/stop setting screen 32 to accept settings. In the screen 35 for output setting for each input port, the same setting items as those in the screen 34 for output setting for each input CH are used except that the input port is set in place of the input CH in the output setting screen 34.

For example, the input port 23(1) is set as the input port, the GPI is set as the output form, and the engine is set as the output device. As the parameters, the GPI output ports 1 and 2 (GPIout1 and GPIout2) are set for the fader start and fader stop, respectively. With such a setting, if the recorder 12(1) is connected to the GPIout1 and GPIout2, the recorder 12(1) is associated with the input port 23(1) via the GPIout1 and GPIout2. Consequently, the device to be controlled by the fader 3 corresponding to the input CH connected to the input port 23(1) based on the input patch setting is the recorder 12(1). Then, when the fader 3 is operated, a fader-on event and a fader-off event as control signals are transmitted to the recorder 12(1) through the GPI output ports 1 and 2, respectively.

In the output setting screens 34 and 35, in addition to the engine, a control panel or the like can be set as the items of output device.

After the step S105 or step S106 has been executed, the process proceeds to a step S107 to update the settings in accordance with the settings accepted via the fader start/stop setting screen 32. At the same time, the display contents of the display 2 are changed. The settings are stored in, for example, the flash memory 5. Then, the present process is completed.

Figure 8:
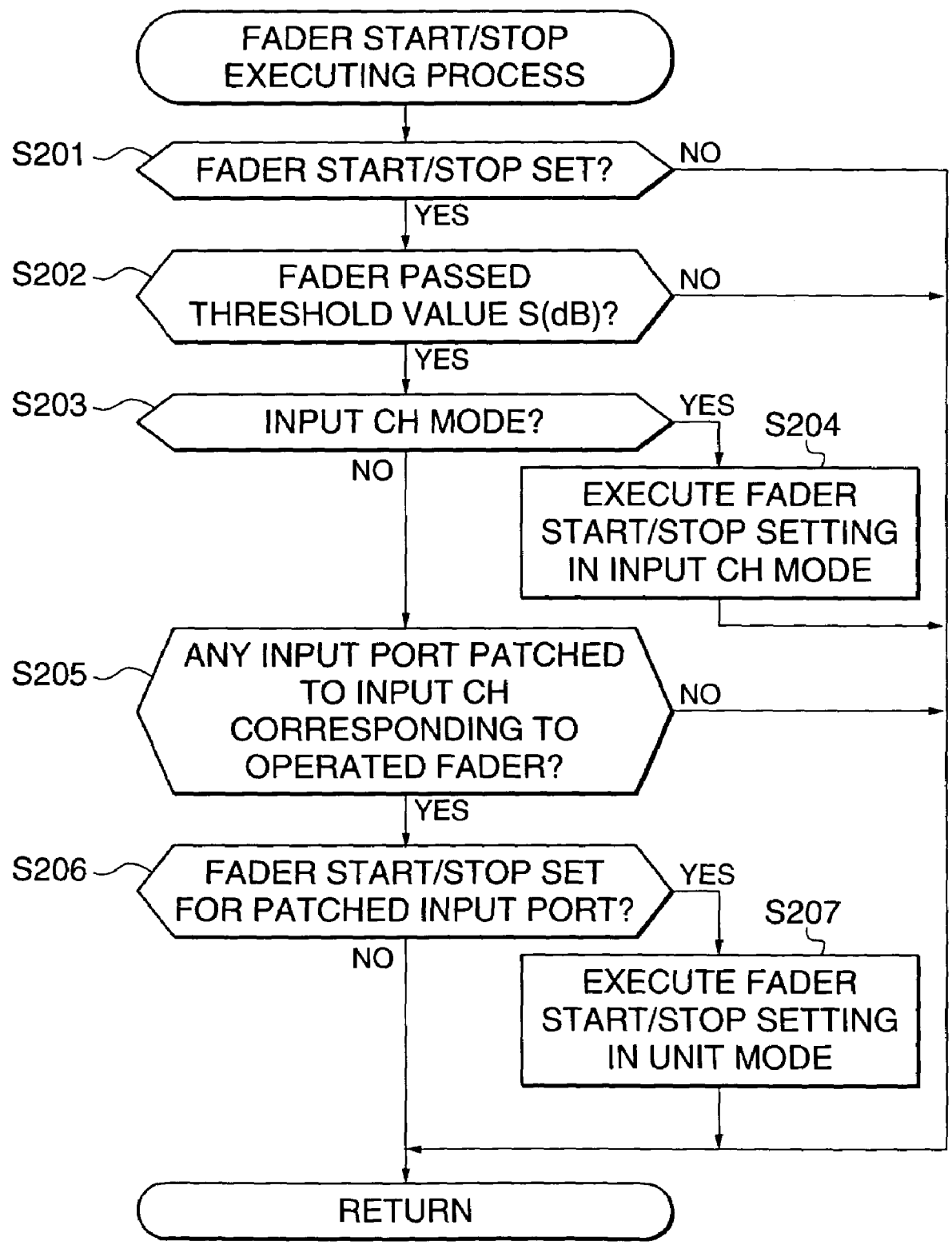
FIG. 8 is a flow chart showing a fader start/stop executing process.

FIG. 8 is a flow chart showing a fader start/stop executing process.

First, it is determined whether or not the fader start/stop has been set (step S201). If the fader start/stop has not been set, the present process is terminated. On the other hand, if the fader start/stop has been set, it is determined whether or not any fader 3 has passed the threshold value S (dB) (see FIG. 3) (step S202). In this case, when the fader 3 shifts from a smaller value to a larger value, this is determined to be a fader start. When the fader 3 shifts from a larger value to a smaller value, this is determined to be a fader stop.

If the result of the determination indicates that the fader 3 has not passed the threshold value S, the present process is terminated. If the fader 3 has passed the threshold value S, it is determined whether or not the assign mode 33 has been set to the "input CH mode" (step S203). If the assign mode 33 has been set to the "input CH mode", the process proceeds to a step S204 to execute a fader start or a fader stop in accordance with the settings for the input CH mode.

Specifically, for a fader start or a fader stop, a fader-on event or a fader-off event, respectively, is transmitted to the recorder 12 associated with the input channel CH corresponding to the operated fader 3 (which has passed the threshold value S). Consequently, a reproduction start operation or a reproduction stop operation is performed by the recorder 12. Further, if the fader 3, which has passed the threshold value S, is operated further upward, the reproduction level of the recorder 12 is correspondingly increased. The reverse operation of the fader 3 reduces the reproduction level. Then, the present process is completed.

On the other hand, if the result of the determination in the step S203 indicates that the assign mode 33 is not the "input CH mode", that is, it is the "unit mode", it is thus determined whether or not any of the input ports 23 is patched (connected based on the input patch setting) to the input channel CH corresponding to the operated fader 3 (step S205). If the result of the determination indicates that no input port 23 has been patched, the present process is terminated. On the other hand, if any of the input ports 23 has been patched, then it is determined whether or not the fader start/stop has been set for the patched input port 23 (step S206). This determination can be made by determining whether or not the patched input port 23 has been set in the output setting screen 35 for each input port, shown in FIG. 7B.

If the result of the determination indicates that the fader start/stop has not been set for the patched input port 23, the present process is terminated. On the other hand, if the fader start/stop has been set for the patched input port 23, the process proceeds to a step 207 to execute the fader start/stop in accordance with the settings for the "unit mode".

Specifically, as is the case with the step S204, a fader-on event or a fader-off event is transmitted to the recorder 12 connected to the GPIout associated with the input port 23 connected, based on the input patch setting, to the input channel CH associated with the operated fader 3 (which has passed the threshold value S), to perform a reproduction start or stop operation. Then, the reproduction level is increased or decreased depending upon subsequent operation of the fader 3 in the same way as described above, followed by the present process being completed.

A description will be given of the device to be controlled by the fader 3 in the "unit mode" with reference to FIGS. 4A and 4B, FIGS. 5A and 5B. It is assumed that the "unit mode" is set in the input patch setting shown in FIG. 4A or 4B and that the fader stop/stop is set for the inputs 23(1) to 23(3).

First, in the input patch setting shown in FIG. 4A, the device to be controlled by the fader 3(1) is the recorder 12(1) connected to the GPIout1 and GPIout2 associated with the input port 23(1) connected to the input channel CH1, as shown in FIG. 5A. Similarly, the devices to be controlled by the faders 3(2) and 3(3) are the recorders 12(2) and 12(3), respectively. In this case, these settings are similar to those in the "input CH mode".

Further, if the input patch setting is switched as shown in FIG. 4B, then the device to be controlled by the fader 3(1) is the recorder 12(2) connected to the GPIout3 and GPIout4 associated with the input port 23(2) connected to the input channel CH1 as shown in FIG. 5B. The device to be controlled by the fader 3(2) is the recorder 12(1) connected to the GPIout1 and GPIout2 associated with the input port 23(1) connected to the input channel CH2. Likewise, the device to be controlled by the fader 3(3) is the recorder 12(3).

Thus, in the "unit mode", in the case of the input channel CH1, the source of transmitting a signal inputted to the input channel CH1 is the recorder 12(1) in the example shown in FIG. 4A and is the recorder 12(2) in the example shown in FIG. 4B. The device to be controlled by the fader 3(1) corresponding to the input channel CH1 is the recorder 12(1) in the example shown in FIG. 4A and the recorder 12(2) in the example shown in FIG. 4B. Therefore, as viewed from each input channel CH, the signal source and the device to be controlled are always the same. This applies even after the input patch setting has been changed. Thus, this matches the user feeling of operation.

According to the present embodiment, the device to be controlled by each fader 3 is the recorder 12 associated with the input channel CH corresponding to the fader 3. Consequently, the relationship between a particular fader 3 and the recorder 12 controlled by the same can be fixedly maintained regardless of the input patch setting. Therefore, the present embodiment is useful in using a particular fader 3 to always control the same recorder 12.

Further, in the "unit mode", the device to be controlled by a fader 3 that is operated is an external device actually connected to the GPIout associated with the input port 23 connected, based on the input patch setting, to the input channel CH corresponding to the operated fader 3. Accordingly, even if the external device as a signal source is changed due to switching of the input patch setting, as viewed from each input channel 3, the changed external device as a signal source and the external device as a control target can always be the same. Therefore, even if the input patch setting is switched due to scene switching or the like, it is unnecessary to take the mismatch between the input and the device to be controlled into account. Intuitive and proper operations can thus be maintained. For example, even if the scene is switched, a particular fader 3 can be used to control an external device which is appropriate to the scene. This allows the user to set the device to be controlled by an operating element, that matches the user's feeling of operation. This in turn allows the user to perform operations with ease.

Further, the "input CH mode" or the "unit mode" can be selectively set. It is thus possible to select, as the setting of the device to be controlled by an operating element, fixed setting or setting matching the user's feeling of operation.

Although in the present embodiment, the external device as a signal source and the external device as a control target as viewed from each input channels CH are always be the same, this is not limitative. Alternatively, the desired control target may be variably set based on the patch setting.

Further, in the present embodiment, an external circuit that outputs a signal to the input patch 22 can be controlled by a fader 3 associated with an input CH to which the input patch 22 is connected, whereby the user can perform operations conveniently. For example, an external device that transmits a signal to an input port 23 may be automatically associated with the input port 23 as the device to be controlled by the fader 3.

Furthermore, although in the present embodiment, the recorders 12 connected to the input ports 23 are illustrated as devices that can be controlled by the faders 3, the present invention is not limited to this. Devices that do not transmit any signals to the input ports 23 may also be controlled by the faders 3. Moreover, the faders 3 are illustrated as operating elements for controlling the recorders 12 or the like. However, any other operating elements may be used, and the contents of the control are also not limited to the illustrated fader/start/stop or the like.

It is to be understood that the object of the present invention may also be accomplished by supplying a system or an apparatus with a storage medium in which the program code of software which realizes the functions of the above described embodiment is stored, and causing a computer (or CPU or MPU) of the system or apparatus to read out and execute the program code stored in the storage medium.

In this case, the program code itself that is read from the storage medium realizes the functions of the embodiment described above, and thus the storage medium storing the program code constitutes the present invention. Further, if the program code is supplied via a transmission medium or the like, the program code itself constitutes the present invention.

Examples of the storage medium for supplying the program code include a floppy (registered trademark) disk, a hard disk, an optical disk, a magnetic-optical disk, a CD-ROM, a CD-R/RW, a DVD-ROM, a DVD-RAM, a DVD-R/RW, a DVD+RW, a NV-RAM, a magnetic tape, a non-volatile memory card. Alternatively, the program may be downloaded via a network.

Further, it is to be understood that the functions of the above described embodiment may be accomplished not only by executing a program code read out by a computer, but also by causing an operating system (OS) or the like that operates on the computer to perform a part or all of the actual operations according to instructions of the program code.

Furthermore, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

What is claimed is:

1. A signal processing apparatus operatively coupled to a plurality of external devices for bi-directional communication therebetween comprising:
   a plurality of input ports that receive audio signals from the plurality of external devices;
   a plurality of output ports that transmit, to said plurality of external devices, control signals for controlling the operation of said plurality of external devices, said control signals being non-audio signals;
   a plurality of input channels to which audio signals are inputted from the external devices;
   a plurality of operating elements associated with respective ones of said input channels;
   an input patch that sets connections between said input ports and said input channels;
   setting means for setting, via a graphical user interface, correspondence between each of said input ports and at least one of said output ports; and
   transmission control means configured to, when one of said operating elements is operated, control to transmit a control signal from one of the output ports to one of said plurality of external devices, wherein said one of the output ports corresponds to the input port that is connected to the input channel with which the operated operating element is associated.

2. A signal processing apparatus according to claim 1, wherein said input patch is capable of changing the connections between said input ports and said input channels.

3. A signal processing apparatus according to claim 1, further comprising a display that displays a screen,
   wherein the display is controlled to display a screen for prompting setting of a output port for each of said input ports.

4. A signal processing apparatus comprising:
   a plurality of input ports that receive audio signals from a plurality of external devices;
   a plurality of output ports that transmit, to said plurality of external devices, control signals for controlling the operation of said plurality of external devices, the control signals being non-audio signals;
   a plurality of input channels to which audio signals are respectively inputted from the external devices associated with respective ones of said input ports;
   a plurality of operating elements associated with respective ones of said input channels;
   an input patch that sets connections between said input ports and said input channels;
   setting means for setting, via a graphical user interface, at least one of first correspondence between each of said input ports and at least one of said output ports and second correspondence between each of said input channels and at least one of said output ports;
   a mode setting device that selectively sets either one of a first mode in which one of the output ports from which the control signal is to be transmitted is determined on an input port basis and a second mode in which one of the output ports from which the control signal is to be transmitted is determined on an input channel basis; and
   transmission control means configured to, when one of said operating elements is operated, control to transmit a control signal from one of the output ports to one of the plurality of external devices, wherein said one of the output ports corresponds to the input port that is connected to the input channel with which the operated operating element is associated in a state where the first mode is set and said one of the output ports corresponds to the input channel with which the operated operating element is associated in a state where the second mode is set.

5. A signal processing apparatus according to claim 4, further comprising a display that displays a screen,
wherein the display is controlled to display a screen for prompting setting of a output port for each of the input ports if said mode setting device sets the first mode, and display a screen for prompting setting of a output for each of the input channels if said mode setting device sets the second mode.

6. A computer readable medium containing a control program executable by a computer to control a signal processing apparatus operatively coupled to a plurality of external devices for bi-directional communication therebetween comprising a plurality of input ports that receive audio signals from the plurality of external devices, a plurality of output ports that transmit, to said plurality of external devices, non-audio control signals for controlling the operation of said plurality of external devices, a plurality of input channels to which audio signals are inputted from the external devices, and a plurality of operating elements associated with respective ones of said input channels, the program causing the computer to perform the steps of:
setting connections between said input ports and said input channels;
setting, via a graphical user interface, correspondence between each of the input ports and at least one of the output ports; and
controlling, when one of said operating elements is operated, to transmit a non-audio control signal from one of the output ports to one of said plurality of external devices, wherein said one of the output ports corresponds to the input channel with which the operated operating element is associated.

7. A computer readable medium containing a control program executable by a computer to control a signal processing apparatus comprising a plurality of input ports that receive audio signals from a plurality of external devices, a plurality of output ports that transmit, to said plurality of external devices, non-audio control signals for controlling the operation of said plurality of external devices, a plurality of input channels to which audio signals are respectively inputted from the external devices associated with respective ones of said input ports, and a plurality of operating elements associated with respective ones of said input channels, the program causing the computer the perform the steps of:
setting connections between said input ports and said input channels;
setting, via a graphical user interface, at least one of first correspondence between each of said input ports and at least one of said output ports and second correspondence between each of said input channels and at least one of said output ports;
selectively setting either one of a first mode in which one of the output ports from which the non-audio control signal is to be transmitted is determined on an input port basis and a second mode in which one of the output ports from which the non-audio control signal is to be transmitted is determined on an input channel basis;
controlling, when one of said operating elements is operated to transmit a non-audio control signal from one of the output ports to one of the plurality of external devices, wherein said one of the output ports corresponds to the input port that is connected to the input channel with which the operated operating element is associated in a state where the first mode is set and said one of the output ports corresponds to the input channel with which the operated operating element is associated in a state where the second mode is set.

8. A signal processing apparatus according to claim 1, wherein the control signal is comprised of one of a fader-on event and a fader-off event.

9. A signal processing apparatus according to claim 4, wherein the control signal is comprised of one of a fader-on event and a fader-off event.

10. A computer-readable medium according to claim 6, wherein the control signal is comprised of one of a fader-on event and a fader-off event.

11. A computer-readable medium according to claim 7, wherein the control signal is comprised of one of a fader-on event and a fader-off event.

* * * * *